Oct. 2, 1951     F. WALLER     2,569,875
SHUTTER FOR DISSOLVING PROJECTED IMAGES WITH
LENSES OF DIFFERENT SIZES
Filed Nov. 10, 1948     2 Sheets-Sheet 1

INVENTOR
Fred Waller
BY
ATTORNEY

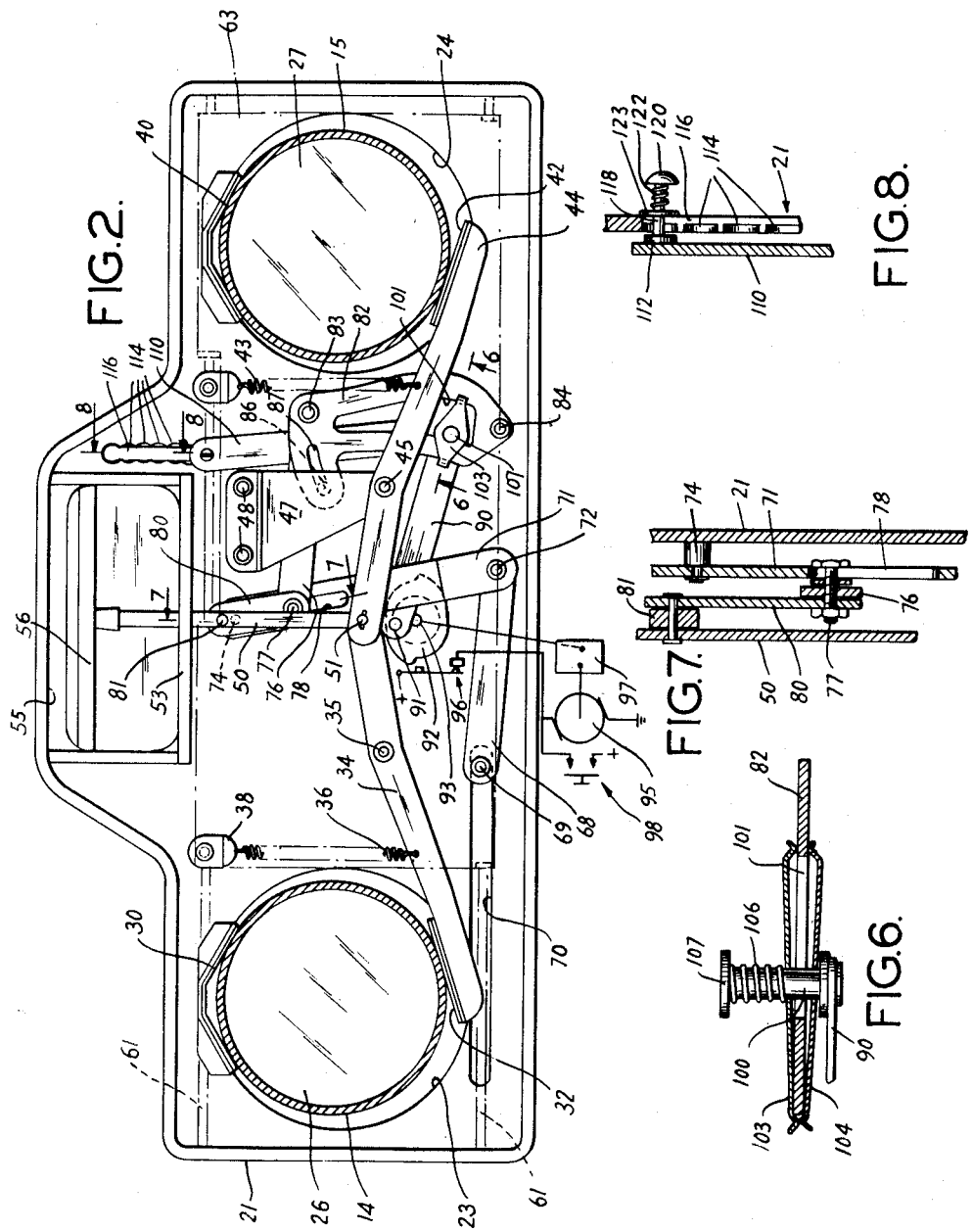

Patented Oct. 2, 1951

2,569,875

UNITED STATES PATENT OFFICE 2,569,875

SHUTTER FOR DISSOLVING PROJECTED IMAGES WITH LENSES OF DIFFERENT SIZES

Fred Waller, Huntington, N. Y., assignor to The Vitarama Corporation, Huntington Station, N. Y., a corporation of New York Application November 10, 1948, Serial No. 59,334

14 Claims. (Cl. 88—26)

This invention relates to improvement in shutters that are used with twin lens picture projectors for dissolving an image projected from one lens into the image projected by the other lens.

One object of the invention is to provide a dissolving shutter with improved means for changing the stroke of the shutter in accordance with lenses of different size. In the preferred embodiment of the invention, the apparatus is an attachment which clamps on the lens mounts of the projector and which has connections through which the distance between the clamp jaws automatically changes the stroke of the shutter so that the stroke accommodates itself to any change in the diameter of the lenses used with the projector. Since the center distance between the axes of the lens mounts remains the same, regardless of the sizes of the lenses that are used, the adjustment of the shutter stroke is made symmetrical about the mid position in which the shutter covers one-half of each lens, that is, the position in which the opposite ends of the shutter are adjacent the axes of the respective lens mounts.

Another object of the invention is to provide an improved dissolving shutter in which the speed of the shutter can be changed to obtain a rapid or slow dissolve, and to obtain such change of speed in combination with a power driven actuator which operates through a cycle and at the same speed regardless of the adjustment of the shutter for rapid or slow dissolving of one picture into another.

Another object of the invention is to combine in a single dissolving shutter apparatus the features of an adjustable stroke and variable dissolving time, and to obtain these results with shutter operating mechanism which is simple and reliable, and economical to manufacture.

Other objects, features and advantages of the invention will appear or be pointed out as the description proceeds.

Figure 1:
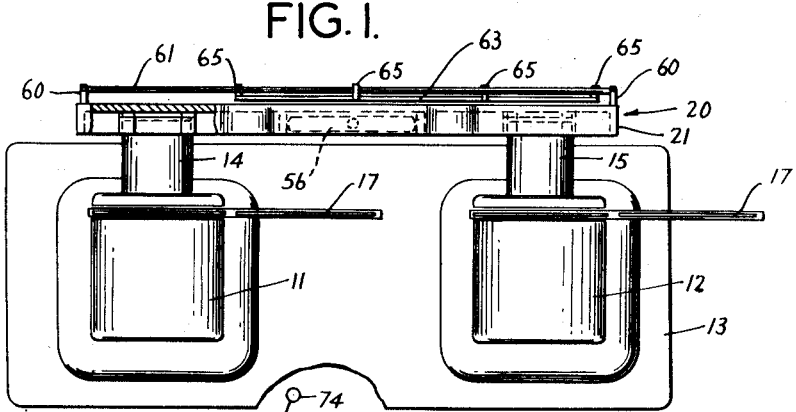

In the drawing, forming a part hereof, in which like reference characters indicate corresponding parts in all the views, Figure 1 is a top plan, diagrammatic view, partly broken away, showing a twin lens projector equipped with a dissolving shutter embodying this invention.

Figure 2 is a rear view of the dissolving shutter apparatus shown in Figure 1.

Figure 3:
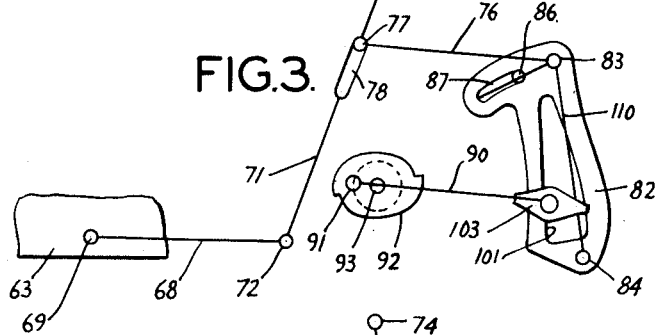
Figure 4:
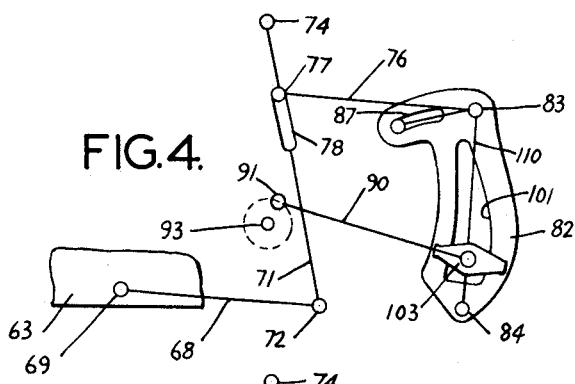
Figure 5:
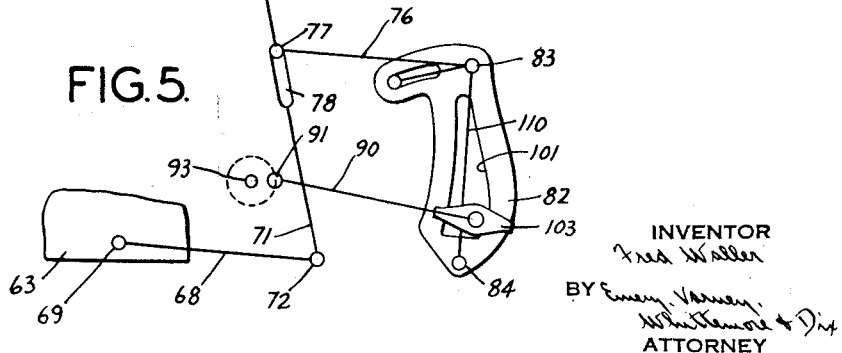

Figures 3, 4, and 5 are diagrammatic views illustrating the operation of the motion transmitting connections of the apparatus shown in Figure 2.

Figures 6 to 8 are enlarged sectional views on the lines 6—6 to 8—8, respectively, of Figure 2.

The twin lens projector apparatus of Figure 1 includes lamp housings 11 and 12 connected with a common base 13. The lamp housings 11 and 12 have lens mounts 14 and 15, respectively, which are adjustable to change the focus in a manner well understood in the art. There is a slide holder 17 behind each of the lens mounts 14 and 15. Each of these slide holders has frames for two slides, and the slide holder behind each of the lens mounts 14 and 15 is moved to bring the next slide into position for projection while the lens and its associated lens mounts are covered by the shutter.

There is a dissolving shutter apparatus 20 which is an attachment for connection with the lens mounts 14 and 15. This dissolving shutter attachment includes a frame 21 with openings 23 and 24 (Figure 2) through which the lens mounts 14 and 15 extend. Lenses 26 and 27 are held in the lens mounts 14 and 15, respectively.

The frame 21 has a fixed clamping jaw 30 at the upper side of the opening 23 in position to contact with the cylindrical outside surface of the lens mount 14. There is a movable clamping jaw 32 on the side of the opening 23 opposite the fixed jaw 30 for pressing the lens mount 14 against the fixed clamping jaw to hold the frame 21 securely on the lens mount.

The movable clamping jaw 32 is attached to the outer end of a lever 34 supported from the frame 21 by a fulcrum pivot 35; and this lever 34 is urged in a clockwise direction about its pivot by a spring 36 which is connected at its lower end to the lever 34 and connected at its upper end to an anchor 38 on the frame 21. At the other end of the frame 21 there is a fixed clamping jaw 40 and a movable clamping jaw 42 similar to the clamping jaws 30 and 32 and located in position to clamp the lens mount 15 between them.

A spring 43 urges the movable clamping jaw 42 toward the fixed jaw 40, and the movable jaw 42 is connected with a lever 44 which is similar to the lever 34 and which rocks about a fixed fulcrum pivot 45. This fulcrum pivot 45 is indirectly connected to the frame 21 through a rigid bracket 47 which is secured to the frame by rivets 48. The purpose of the bracket 47 is to locate the lever 44 in front of the lever 34 and in front of other parts of the shutter operating mechanism.

The levers 34 and 44 are connected at their inner ends to a common pull rod 50 by pin and slot connections 51. The pull rod 50 extends upward through a web 53 of the frame 21, and into an opening 55 in the upper part of the frame. Within this opening 55 there is a handle 56 by which the pull rod 50 can be moved upward to rock the levers 34 and 44 against the tension of their springs 36 and 43, respectively, so that the movable clamping jaws 32 and 42 can be shifted away from the fixed clamping jaws 30 and 40 when the attachment is to be initially positioned on the lens mounts of the projector apparatus.

As soon as the handle 56 is released, the springs 36 and 43 move the levers 34 and 44 about their fulcrum pivots until the movable clamping jaws 32 and 42 have contacted the lens mounts and clamped the lens mounts against the fixed clamping jaws 30 and 40. It will be apparent that the final position of the pull rod 50 depends upon the diameters of the lens mounts 14 and 15. If the lens mounts are large, the final position of the pull rod will be near the upper end of its travel; whereas if the lens mounts 14 and 15 are replaced with other lens mounts of smaller diameter, the final position of the pull rod 50 and handle 56 will be much lower than formerly.

There are lugs 60 (Figure 1) extending from the front of the frame 21, and these lugs 60 support rods 61. The shutter comprises a shutter plate 63 supported by the rods 61. There are tabs 65 bent outward from the shutter plate 63 with holes through which the rods 61 extend, there being two tabs 65 in position to run on the upper rod 61 (Figure 2), and two tabs 65 in position to run on the lower rod 61 which is parallel to the upper rod.

The shutter plate 63 preferably has a length equal to the distance between the axes of the lens mounts 14 and 15. This means that there is a mid position in which the shutter plate 63 will simultaneously cover one-half of each of the lenses 26 and 27.

The shutter plate 63 is moved lengthwise along the rods 61 by a link 68 connected to the shutter plate by a pivot stud 69 extending through a slot 70 in the frame 21. The link 68 is operated by a crank arm 71 to which the link 68 is connected by a pivot 72. This crank arm 71 swings about a fulcrum 74 connected at a fixed location with the frame 21. The crank arm 71 is oscillated back and forth through an operating stroke by an operator link 76 connected with a pin 77 which extends through a slot 78 in the upper end of the crank arm 71.

The pin 77 is connected with the lower end of a link 80 that hangs down from a supporting pivot 81 connected to the pull rod 50. This link 80 moves up and down with the pull rod 50 and raises and lowers the pin 77 and the end of the operator link 76 which is connected with the pin 77. With this construction, the position of the pin 77 in the slot 78 varies with the position of the pull rod 50 so that when the frame 21 is clamped on large lens mounts, the pin 77 is located near the upper end of the slot 78; whereas the pin 77 is located near the lower end of the slot 78 when the frame 21 is clamped on lens mounts of small diameter. This adjustment of the position of the pin 77 changes the stroke of the shutter plate 63 in accordance with the diameters of the lens mounts because the stroke of the pin 77, which remains constant, produces larger angular movements of the crank arm 71 when the pin 77 is nearer the upper end of the slot 78 and nearer the fulcrum 74 about which the crank arm 71 oscillates.

The crank arm operator link 76 has one end connected with an operating link 82 by a pivot connection 83. This operating link 82 rocks about a fulcrum 84 on the frame 21 and oscillates through a fixed stroke which is limited by a stud 86 extending from the fixed bracket 47 through a slot 87 in the upper end of the operating link 82. The slot 87 is curved about the axis of the fulcrum 84 as a center. The "stroke" or angle through which the link 82 moves is the same for all adjustments of the invention.

The operating link 82 is oscillated by a connecting rod 90 through a lost motion connection which will be described more fully in connection with Figure 6. This connecting rod 90 is connected to a crank pin 91 extending from a plate 92 which is secured to a shaft 93. There is a cam face on the peripheral edge of the plate 92 but this is of no significance in the operation of the motion transmitting connections through which the shaft 93 operates the shutter plate 63, and the plate 92 merely constitutes a crank in so far as the motion transmitting connections are concerned.

The shaft 93 is rotated by an electric motor 95 through speed reducing gearing 97. The operation of the motor 95 is controlled by a switch 96 that has an abutment in the path of the high parts of the cam face on the plate 92, and these high parts of the cam open the switch 96 and stop the motor 95 each time the shaft 93 makes a half turn.

The motor 95 is started by a manually operated push button switch 98 which supplies power to the motor 95 until the motor has turned the shaft 93 and the cam plate 92 far enough to permit the switch 96 to close. The manually operated switch 98, which is normally open, can then be released and the motor 95 continues to run until the shaft 93 has turned through approximately 180 degrees. This amount of rotation brings the next high part on the cam into position to open the switch 96.

The motor 95 coasts to some extent after the power is cut off, and does not always coast for exactly the same length of time, but variation in the position at which the motor stops can be tolerated within fairly wide limits because the gear reduction unit 97 makes a substantial movement of the motor produce comparatively little angular movement of the shaft 93. The speed of operation of the motor 95 is the same for all adjustments of the invention.

Figure 6 shows the lost motion connection between the connecting rod 90 and the operating link 82. A stud 100 extends out from the connecting rod 90 through a wide slot 101 in the operating link 82. A spring clip, comprising two resilient elements 103 and 104, bridges the slot 101 and contacts with the forward and rearward faces of the operating link 82. The stud 100 passes through openings in the resilient elements 103 and 104. The element 103 is urged toward the other resilient element 104, to clamp the operating link 82 between them, by a coil spring 106 which surrounds the stud 100 and which is compressed between the resilient element 103 and a head 107 at the outer end of the stud.

When the stud 100 is at the left-hand end of the slot 101, the ends of the resilient elements 103 and 104 come together just beyond the left-hand edge of the operating link 82. The clamping force of these resilient elements 103 and 104 is sufficient to cause the operating link 82 to move as a unit with the stud 100 as the stud moves toward the left when the parts are in the positions shown in Figure 6.

When the operating link 82 reaches its limit of travel toward the right and the left-hand end of the slot 87 (Figure 2) strikes the pin 86, the stud 100 continues to move and the resilient elements 103 and 104 (Figure 6) are forced apart by the cam action of their sloping surfaces against the corners at the left-hand edge of the operating link 82. Further movement of the stud 100 carries the resilient elements 103 and 104 far enough to the right to permit their right-hand end portions to contact with one another just beyond the right-hand edge of the operating link 82.

With the parts in this position, the operating link 82 will move as a unit with the stud 100 on the return stroke of the connecting rod 90 until the operating link 82 has reached its limit of movement on the return stroke. The resilient elements 103 and 104 are then forced apart, as previously described, and returned to positions shown in Figure 6. From this description it will be apparent that the lost motion connection between the connecting rod 90 and the operating link 82 differs from the usual lost motion connection in that the parts move together during the initial movement of the driving element in each direction and the lost motion is taken up at the end of the stroke instead of at the beginning.

The slot 101 is of substantial height and is shaped so that it decreases in width toward its upper end. This feature makes it possible to vary the amount of lost motion between the connecting rod and the operating link 82. If the stud 100 is raised to the upper end of the slot 101, there is no lost motion because the slot 101 is no wider than the stud 100 at the upper end of the slot.

The end of the connecting rod 90 from which the stud 100 extends is raised and lowered in the slot 101 by a supporting link 110 which has its lower end connected with the stud 100. The upper end of the supporting link 110 has a boss 112 (Figure 8) which fits into any one of overlapping recesses 114 in the upper portion of the frame 21 along a slot 116.

This slot 116 extends through the frame 21 along the entire length of the row of openings 114 to provide clearance for a pin 118 that extends from the boss 112 and through the slot 116. A knob 120 at the outer end of the pin 118 serves as a convenient grip for pushing the boss 112 out of any one of the openings 114 when the supporting link 110 is to be raised or lowered to change the lost motion of the shutter operating mechanism. The boss 112 is urged toward the openings 114 by a coil spring 122 compressed between the knob 120 and a washer 123 which is large enough to straddle the slot 116. The row of openings 114 is long enough to permit adjustment of the stud 100 from the bottom to the top of the slot 101.

Figures 3 to 5 illustrate a cycle of operation of the shutter operating mechanism. In Figure 3 the crank pin 91 is in the position that locates it as far as possible toward the left and the shutter plate 63 is at the left-hand end of its stroke.

Further movement of the crank pin 91 moves the connecting rod 90 while the operating link 82 remains stationary, and the spring clamp, including the resilient element 103, is forced to release its grip upon the left-hand edge of the operating link 82 and to move across the slot 101. The element 103 is shown in Figure 4 at the midpoint of its travel across the slot 101.

When the crank pin 91 has traveled as far as possible toward the right, the parts are in the position shown in Figure 5, and the spring clip which includes the resilient element 103 is hooked over the right-hand edge of the operating link 82 and ready for a return stroke. The motor stops when the parts are in the position shown in Figure 5, and one-half revolution of the shaft 93 represents a half-cycle of operation for the shutter operating mechanism. When the motor is again started, the crank pin 91 moves through another half revolution about the shaft 93 and the shutter operating mechanism completes its cycle by moving the shutter plate through its return stroke.

The preferred embodiment of the invention has been illustrated and described, but changes and modifications can be made and some features can be used alone or in different combinations without departing from the invention as defined in the claims.

I claim as my invention:

1. Dissolving shutter apparatus for a twin lens picture projector that has lens mounts, said apparatus including, in combination, shutter means for alternately covering one lens and then the other, a support on which the shutter means moves through a stroke while shifting from its position over one lens to its position over the other lens, an adjustment for determining the length of the stroke, spaced elements connected with the adjustment and relatively movable toward and from one another for gripping a lens mount of the projector, said adjustment being controlled by the spacing between said elements to correlate the stroke with the diameter of the lens mount.

2. Apparatus for dissolving the images from a twin lens projector into one another, said apparatus comprising a frame for connection to lens mounts of the projector, spaced jaws, including movable and fixed jaws, upon the frame for gripping the lens mounts to hold the frame in a fixed position on the lens mounts, shutter means carried by the frame and movable through a stroke from a position in which one lens is covered and the other uncovered to another position where the first lens is uncovered and the second lens covered, operating mechanism for moving the shutter means including an adjustment for changing the stroke of the shutter means, and a connection between the movable gripping jaws and said adjustment for moving the adjustment to reduce the stroke when the movable gripping jaws are moved closer to the fixed gripping jaws.

3. Dissolving shutter apparatus for a twin lens picture projector including a single shutter element of a length equal to substantially the center distance between the optical axes of the projector lenses, a support on which the shutter element is movable through a stroke to alternately cover and uncover the respective lenses of the projector, operating mechanism for moving the shutter back and forth along its stroke, a device for adjusting the shutter operating mechanism to change the stroke, and a movable contact element having a surface that bears against the mount of at least one of the lenses and that has a connection to said device constructed and arranged to adjust the device to shorten the shutter stroke as the contact element moves closer to the optical axis of the lens.

4. Dissolving shutter apparatus for twin lens picture projectors including a shutter element having an effective length substantially equal to the distance between the optical axes of the projector lenses, lens mounts in which the projector lenses are held, a support on which the shutter is movable through a stroke for successively covering alternate lenses, operating mechanism that displaces the shutter on said support back and forth through a complete stroke, said operating mechanism including common adjustment means that change the length of the stroke equally on both sides of the mid-stroke position of the shutter element.

5. A demountable dissolving shutter attachment for use with twin lens picture projectors having lens mounts with substantially cylindrical outside surfaces, a frame with spaced openings through which the lens mounts of the projector extend, a fixed clamping jaw at the top of each of the openings in position to contact with the outside surface of the lens mount which extends through the opening, levers pivoted to the frame at spaced points between the lens mount openings, said levers extending in opposite directions across the lower portions of the openings and each of said levers having a clamping jaw thereon movable toward and from the fixed clamping jaw at the upper end of the adjacent opening through the frame, a common operating linkage that moves both of the movable clamping jaws in unison and that maintains them equally spaced from their associated fixed clamping jaws, a shutter element having a length substantially equal to the distance between the axes of the lens mounts with which the attachment is intended to be used, a guide on the frame along which the shutter moves through a stroke for selectively covering and uncovering alternate lenses of the projector, an operating linkage for moving the shutter through its stroke, a device for adjusting the operating linkage to change the stroke symmetrically about a mid position of the shutter in which the shutter covers one-half of each lens, and a connection between the levers and said device constructed and arranged to move said device to vary the shutter stroke in accordance with the distance between the jaws.

6. A dissolving shutter for twin lens picture projectors including a constant speed actuating means, a shutter unit, a support on which the shutter is movable back and forth through a stroke during a cycle of operation of said actuating means to selectively cover and uncover alternate lenses of the projector, motion transmitting connections between the constant speed actuator and the shutter unit and through which the shutter unit is moved by said actuating means, the motion transmitting connections including a lost motion connection and a linkage adjustable to make the lost motion connection change the percentage of the cycle during which the shutter unit is in motion.

7. A dissolving shutter apparatus for use with twin lens picture projectors, said apparatus comprising, in combination, a constant speed actuator operable through successive cycles, a shutter unit movable through a stroke for selectively covering and uncovering alternate lenses of the projector, motion transmitting connections between the actuator and the shutter unit including a lost motion connection and a device movable to vary the amount of lost motion in said connection to change the percentage of time during which the shutter unit is in motion for each cycle of operation of the actuator.

8. The apparatus defined in claim 7 in which there is a resilient operating element on the driving side of the lost motion connection, and in which there is an abutment for limiting the movement on the driven side of the lost motion connection.

9. A dissolving shutter apparatus for twin lens picture projectors including a motor, a driving shaft connected with the motor through reduction gearing, a switch for controlling the operation of the motor, a switch actuator connected with the shaft and having means thereon for operating the switch to stop the motor after each half revolution of the shaft, shutter means movable through a stroke for selectively covering and uncovering alternate lenses of the projector, motion transmitting connections between the shutter means and the shaft including a crank on the shaft, a connecting rod between the crank and an operating link of the motion transmitting conections, a pin-and-slot connection by which the connecting rod is joined to the operating link to provide a lost motion connection, a spring clip that holds the pin at opposite ends of the slot during movement of the connecting rod in opposite directions, an abutment limiting the stroke of the operating link to compel release of the spring clip during the latter part of the stroke of the connecting rod, and means for varying the length of the slot in the path of the pin to control the lost motion.

10. A dissolving shutter apparatus for twin lens picture projectors including shutter means movable through a stroke for selectively covering and uncovering alternate lenses of the projector, an actuator for operating the shutter, motion transmitting connections between the actuator and the shutter including a device adjustable to change the length of the stroke imparted to the shutter means by the actuator so as to accommodate the shutter means to lenses of different size, and another device adjustable to change the speed at which the shutter means are moved by the actuator while the actuator speed remains constant.

11. A dissolving shutter apparatus for use with twin lens picture projectors, said apparatus including shutter means and an actuator having a cycle of operation during which said shutter means is movable through a stroke for selectively covering and uncovering alternate lenses of the projector, and motion transmitting connections between the actuator and the shutter means, said motion transmitting connections including a crank arm connected with the shutter means, a crank operator adjustable to change the stroke of the crank arm, actuating mechanism for the operator including a constant stroke pivot, and a device adjustable to change the relative speed of the pivot with respect to the actuator.

12. The dissolving shutter apparatus described in claim 11 with the actuator movable at the same speed for all adjustments of the apparatus, and a variable lost motion connection between the actuator and the constant stroke pivot for controlling the speed of the pivot by changing the amount of lost motion and the resultant length of time during which the pivot is in motion during each cycle of operation of the actuator.

13. Dissolving shutter apparatus for twin lens picture projectors including shutter means movable through a stroke, an actuator movable through a cycle for each operation of the shutter means, and motion transmitting connections between the actuator and the shutter means including a releasable operating mechanism combined with a lost motion connection and constructed and arranged to impart motion through the lost motion connection during the first part of the cycle of operation and then to release and take up the lost motion during the latter part of each cycle of operation.

14. Dissolving shutter apparatus including an attachment with openings for receiving the lens mounts of a twin lens picture projector, a fixed jaw on one side of each of said openings and a movable jaw at the opposite side of each of said openings for gripping the lens mounts between the fixed and movable jaws to secure the attachment to the projector, shutter means supported on the attachment and movable through a stroke to selectively cover and uncover alternate lenses of the projector, mechanism for operating the shutter including a crank arm and a device connected with the movable jaws for changing the stroke of the crank arm in accordance with the distance between the fixed and movable jaws.

FRED WALLER.

REFERENCES CITED

The following references are of record in the file of this patent:

UNITED STATES PATENTS

| Number | Name | Date |
| --- | --- | --- |
| 1,144,108 | Buttner et al. | June 22, 1915 |
| 2,328,239 | Wengel | Aug. 31, 1943 |

FOREIGN PATENTS

| Number | Country | Date |
| --- | --- | --- |
| 387,757 | France | May 14, 1908 |